July 29, 1941.  S. R. JOHNSON  2,250,713
AUXILIARY TRACTION DEVICE
Filed July 19, 1940
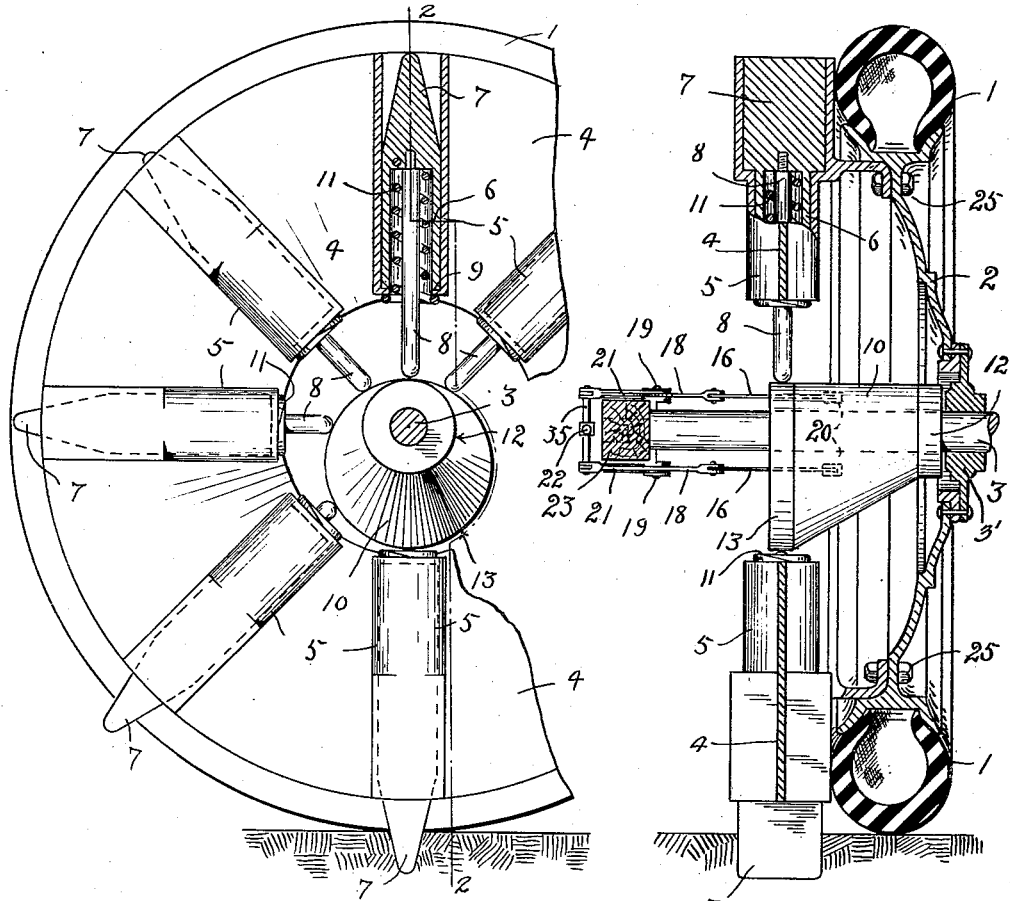
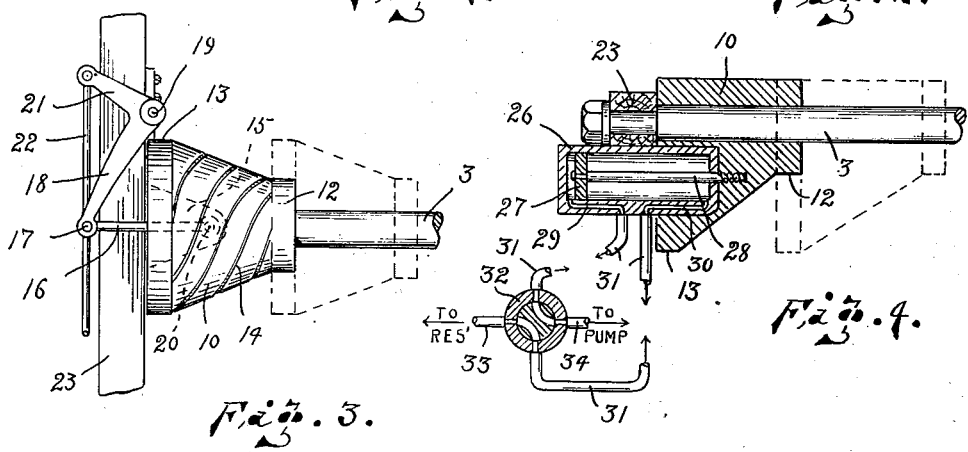
INVENTOR.
Sam R. Johnson.
BY Geo Stevens.
ATTORNEY.

Patented July 29, 1941

2,250,713

UNITED STATES PATENT OFFICE 2,250,713

AUXILIARY TRACTION DEVICE

Sam R. Johnson, Altamont, S. Dak.

Application July 19, 1940, Serial No. 346,403

6 Claims. (Cl. 301—47)

This invention relates to auxiliary traction means for heavy trucks or tractor vehicles, the principal object being to provide simple and effective means for the purpose which is selectively manipulated by the vehicle operator as occasion demands.

Another object of the invention is that of providing a novel type of self cleaning lugs.

Still other objects and advantages of the invention will appear in the following description thereof.

Referring now to the accompanying drawing, forming part of this application, and wherein like reference characters indicate like parts:

Figure 1 is a diagrammatic elevation of an auxiliary traction device for a tractor wheel showing one of the radially disposed traction augmenting devices fully retracted and in section, while the opposite lowermost lug is illustrated as fully extended and the intermediate ones in their progressively extended position, and with the outer supporting beam omitted, and showing the relative position of the outer periphery of a tractor wheel in full lines.

Figure 2 is a section on the line 2—2, Figure 1, showing parts in elevation, and also showing the outermost beam, and the tractor wheel in section.

Figure 3 is a plan view of one type of mechanical means for manipulation of the auxiliary traction elements.

Fig. 4 is a vertical sectional view of the cam and outer end of the vehicle axle and means for reciprocating the cam hydraulically, and with a modified form of attachment for the beam.

It is well known in the art of tractor manufacture that the principal or driving wheels of the tractor are mounted upon axles which may or may not protrude considerably beyond the wheel employed, and it is now deemed as most ideal practice in many farm implements particularly, to employ pneumatic tires on such wheels, and in many instances the rear wheels are in pairs upon either side of the vehicle.

However, rather than the use of so many wheels or tires, it is deemed, in some instances, at least, advisable to provide auxiliary traction augmenting devices mounted just outside of a single tire and wheel, as for example, shown at 1 in Figures 1 and 2 of the accompanying drawing. In this instance I have also illustrated at 2 a somewhat disc-like wheel carrying the tire 1, and this wheel may or may not be longitudinally adjustable on its supporting axle 3, and here shown as attached to said axle as by a suitable hub-like member 3'.

The auxiliary traction device in this instance contemplates the use of a lug carrying disc illustrated at 4, and formed with the predetermined and desired number of radially disposed cylindrical spoke-like members 5 having rectangular shaped outer ends. Within each cylinder 5 is reciprocably mounted a lug, the innermost body portion of which is indicated at 6 and which is of hollow cylindrical form, and carries integrally therewith the preferred wedge-shaped lug proper 7. The support for each of these lugs comprises the pintle or rod 8 which extends through the bottom 9 of the cylinder 5, and each rod 8, within the cylinder 5, and body 6 of the lug, is provided with a contractile spring 11 which normally holds each lug in its fully retracted or withdrawn position as clearly shown in Figure 1. Each rod 8, extending through the bottom 9 of the cylinder 5, engages the eccentrically shaped hub-like cam member 10, carried upon the outer end of the wheel axle 3 of the tractor.

Now it is intended by this construction to insure the reciprocal operation of the lugs, being either all retracted and ineffective, or each one in its turn as the wheel revolves being forced outwardly from the rim of the tractor disc 4, and for which purpose the cam 10 has formed thereupon at either end a continuous circular track indicated at 12 and 13. Now it will be noted that the cam 10 for each wheel is of considerable thickness and while it is provided at either end with a flat track 12 and 13 the inclined portion between these two tracks may be formed with helically shaped grooves as indicated in Fig. 3 at 14, one for each rod 8, so that when the cam is thrust inwardly towards the wheel, for example in shifting the lugs from inactive to active position, it will be but a simple matter to perform such act, for example by the mechanical means shown, and the helical grooves 14 formed upon the outer surface of the cam will assist in the longitudinal travel of the rods 8 thereupon.

In respect to this mechanical means, attention is directed to Figures 2 and 3 of the drawing, wherein the larger end of the cam 10 is chambered, as indicated in dotted lines at 15 to provide a suitable recess into which the otherwise free end of the link 16, pivoted as at 17 to the long arm 18 of the bell crank, pivoted as at 19, may be pivotally attached to the cam as at 20; the other or short arm of the bell crank being illustrated at 21, and which is operated as by a cable or rod indicated at 22, and caused to function in any desired manner for example by the operator of the vehicle. There are two of such crank arms for strength and positive operation of the cam member and are united outwardly of the support 23 as by the cross member 35 to which the rod 22 is attached. From the foregoing it is readily seen that a pull on the cable or the rod 22 to the bell-cranks just described will cause the links 16 to slide the cam 10 inwardly on the shaft and cause the large flat eccentric surface 13 of the cam to take the place of the concentric track 12 for engagement with the inner ends of the rods 8, so that, as the wheel rotates in either direction, each rod, as it starts from its vertical position above the center of the wheel, will be thrust outwardly, and when in its vertical position below the center of the wheel, will be fully extended from the disc 4 and materially beyond the outer normal peripheral edge of the pneumatic tire, there functioning as an ideal means for augmenting the traction of the wheel.

It is to be understood that at all times the cam is non-rotatable, and to insure this condition in the simplest manner possible, I have provided two bell crank levers pivoted on the same vertical shaft and engaging the cam upon both the upper and lower face of the supporting beam 23, which is installed on the side of the tractor in any desired manner externally of the traction wheels thereof.

It will be noted that the outer end of each cylinder is rectangular in form for snugly housing its cooperative lug 7 which as before stated is preferably of wedge shape in side elevation, while the cylindrical body portion forms a staunch support for the lug, and the auxiliary lug carrying disc 4 may be attached to the web of the tire 1 in any desired manner as illustrated at 25. By this arrangement it is obvious that when the lugs are brought into action they each will be self-cleaning as they are reciprocated by the action of the wheel.

In Figure 4 is illustrated one form of hydraulically operating the cam 10, and which contemplates the use of a cylinder indicated at 26 which may be fastened in any desired manner to the under side of the supporting beam 23, outwardly of the wheel, for example by integral lugs formed upon opposite sides thereof and bolted to the beam 23, and which beam forms a bearing for the axle 3.

In this arrangement one end of the cam 10 is cored out to reciprocally engage the inner end of the cylinder 26, this being simply illustrative of one way of economizing in space so as to avoid excessive projection of any of the apparatus beyond the beam 23. Within this cylinder is provided a piston and rod 27 and 28 respectively, the inner end of the latter being screw-threadedly mounted centrally of the chamber within the cam 10 so that any motion of the piston back or forth will similarly affect the cam. For such reciprocable action of the piston and cam I have provided suitable passageways and ports 29 and 30 within the lower wall of the cylinder 26 for application of the liquid being used for the purpose alternately to opposite ends of the cylinder. These passageways are each connected as by pipes 31 to any form of suitable reversing valve, indicated at 32, which has suitable connections 33 and 34, the former to the reservoir and the latter to the form of pump being employed, whereby manipulation of the valve 32 will accomplish the desired result in thrusting the cam back and forth as the case may be that it may function in a similar manner as previously described when operated by the mechanical means shown, or any suitable substitute therefor.

Having thus described my invention, what I claim and desire to secure by Letters Patent, is:

1. An auxiliary traction device for heavy pneumatic tired vehicles comprising an axle extending beyond the rear wheels of said vehicle, a disc mounted upon said vehicle wheels, lugs equally spaced about and carried by said disc and extendable radially therebeyond to engage the ground, means for normally holding said lugs retracted, a cam carried upon the vehicle axle having a surface concentric with the vehicle axle on which the lugs normally ride, and a surface eccentric thereto, and means for sliding said cam on said axle so that the lugs ride on said eccentric surface and are successively extended to ground engaging position as the wheel rotates.

2. An auxiliary traction device for heavy pneumatic tired vehicles having an axle extending beyond the rear wheels of said vehicle, comprising, a disc mounted upon said vehicle wheels, lugs carried by said disc and extendable therefrom to engage the ground, means for normally holding said lugs retracted within said disc, a cam centrally of said disc and having a surface concentric with the vehicle axle on which said lugs normally ride and a surface eccentric thereto, and means for moving said cam so that the lugs ride on said eccentric surface and are successively extended to ground engaging position as the wheel rotates.

3. An auxiliary traction device for commercial vehicles comprising rear wheels, an axle extending beyond said rear wheels, a disc mounted upon said vehicle wheels, lugs equally spaced about said disc and extendable therefrom to engage the ground, means for normally holding said lugs retracted, a cam having a surface concentric with the vehicle axle on which the inner ends of said lugs normally ride, and a surface eccentric thereto, and means for moving the cam so that the inner ends of said lugs are transposed from said concentric surface to said eccentric surface and are thereby successively extended to ground engaging position as the wheel rotates.

4. An auxiliary traction device for commercial vehicles comprising rear wheels, an axle extending beyond said rear wheels, a disc mounted upon said vehicle wheels, lugs extendable outwardly of said disc to engage the ground, a cam having a surface concentric with the vehicle axle on which the inner ends of said lugs normally ride, a surface eccentric thereto and a surface therebetween having a plurality of helically disposed grooves extending between said concentric and eccentric surfaces, and means for moving said cam so that the lug operating rods may engage said grooves in their travel from one end of said cam to the other.

5. In an auxiliary traction device for commercial vehicles comprising rear wheels, an axle extending beyond said rear wheels, a disc wheel on said vehicle wheel through which a plurality of equally spaced lugs are selectively extendable, a cam non-rotatably carried upon said axle and having an eccentric surface and a concentric surface spaced from each other and a cam surface extending therebetween, the inner ends of said lugs normally riding on said concentric surface, and a plurality of helically shaped grooves upon said cam surface extending between said surfaces for the guidance of the inner ends of said lugs when being moved from inactive to active position and vice-versa.

6. In an auxiliary traction device embodying a disc wheel having a plurality of radially disposed lugs selectively extendable therefrom, a cam for manipulating said lugs having a concentric surface on which the inner ends of said lugs normally ride, a spaced eccentric surface, a cam surface extending therebetween and a plurality of helical grooves extending on said cam surface between said concentric and eccentric surfaces on which the inner ends of said lugs ride when being moved from inactive to active position and vice-versa.

SAM R. JOHNSON.